June 1, 1965     T. F. KILIAN     3,187,159
CONSUMABLE ELECTRODE CONSUMPTION INDICATOR
Filed March 23, 1964
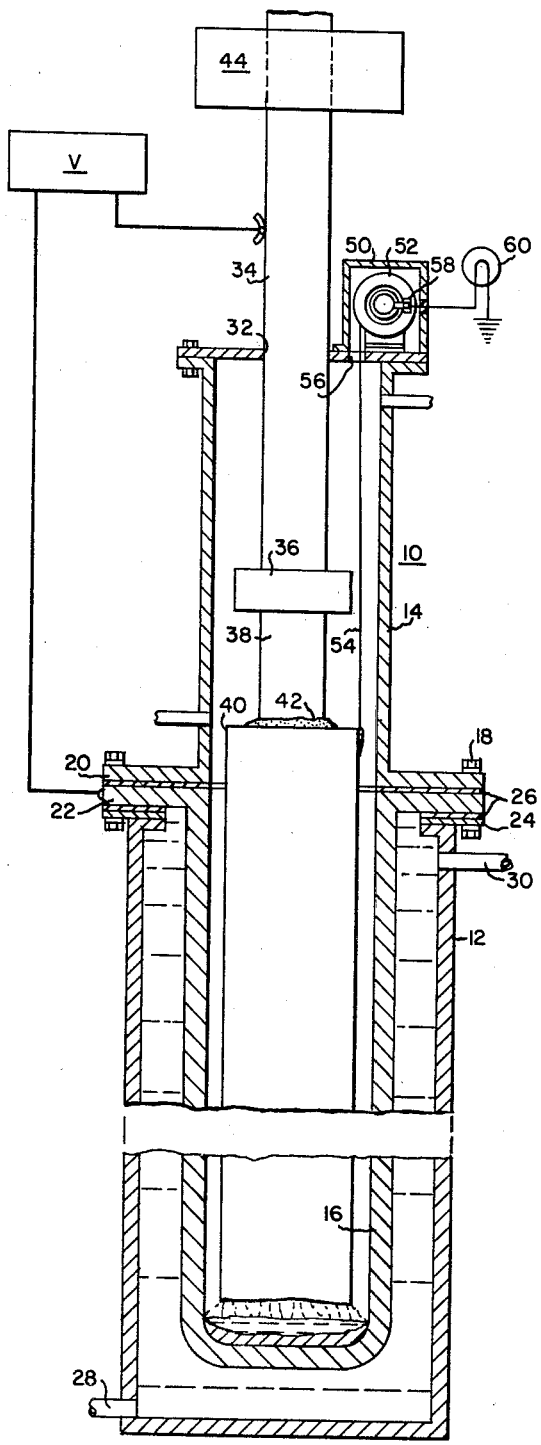
Fig. 1
Fig. 2
INVENTOR
THADDEUS F. KILIAN
ATTORNEY

United States Patent Office 3,187,159
Patented June 1, 1965

3,187,159
CONSUMABLE ELECTRODE CONSUMPTION INDICATOR
Thaddeus F. Kilian, Watervliet, N.Y., assignor to Allegheny Ludlum Steel Corporation, Brackenridge, Pa., a corporation of Pennsylvania
Filed Mar. 23, 1964, Ser. No. 353,915
3 Claims. (Cl. 13—9)

This invention relates generally to consumable electrode melting, and more particularly to a method and device which will provide a signal when a given condition occurs during consumable electrode melting. In even more particular aspects, this invention concerns a method and device which will provide a signal when the melting of a consumable electrode has progressed a preselected amount.

In consumable electrode melting furnaces, an elongated electrode of the metal to be melted is utilized. An arc is struck and maintained between the end of the electrode and a crucible or metal therein and in which the melted metal is collected and solidifies. The electrode is attached by a clamp to a ram and drive equipment therefor which will lower the electrode as it is being melted. Although it is desirable to melt as much of the electrode as possible, nevertheless the electrode cannot be melted too close to the clamp or the clamp will be damaged by the heat, or in some cases even melted. With most furnaces, it is difficult to ascertain by observation when the melting of the electrode has progressed to the region or portion adjacent the clamp, and mechanical devices have proved unsatisfactory in providing this information.

It is therefore a principal object of this invention to provide a signal when a given condition occurs during consumable electrode melting.

A more specific object of this invention is the provision of a signal when the melting of a consumable electrode has progressed a predetermined amount.

A further object of this invention is to provide means for effecting a signal when the melting of a consumable electrode is approaching the clamped area so that melting can be discontinued.

Still another, more general object of this invention is the provision of an electric signal to indicate a specific, selectable amount of melting of a consumable electrode.

Yet an additional object of this invention is the provision of a device which can be positioned to signal any selected amount of melting which has taken place in a consumable electrode.

These and other objects, together with a fuller understanding of the invention, will become apparent from the following description, when taken in conjunction with the accompanying drawing in which:

FIGURE 1 is a side elevational view, somewhat schematic and partially in section, of a consumable electrode melting furnace embodying the signalling device of this invention, and FIG. 2 is a detailed view of the reel and its mounting shown in FIG. 1.

Referring now to the drawing, and in particular to FIG. 1, the signalling device of this invention is embodied in a consumable electrode melting furnace of any suitable design and which may comprise a furnace housing 10 which has a lower shell 12 and an upper shell 14. A crucible 16 of copper is disposed in the lower shell 12 and is secured to the housing by means of bolts 18 which extend through flanged portions 20, 22 and 24 of the upper shell, crucible and lower shell, respectively, in an insulated manner. The crucible is insulated from the housing by annular rings 26 of electrical insulation disposed on opposite sides of the flange portion 22 and through which the bolts 18 also extend. The lower shell 12 serves as a water jacket for maintaining cooling water in the space between the crucible 16 and the lower shell 12. A suitable water inlet 28 and outlet 30 are provided.

The upper shell 14 of the housing 10 has a top aperture 32 provided with any suitable sealing means (not shown) and through which a ram 34 is slidably disposed in sealed relation therein. The ram 34 is provided with a clamp 36 as, for example, the clamp shown in Patent No. 3,046,319, at the end thereof which clamps the stub end 38 of the electrode to be consumably melted. The stub end 38 of the electrode is usually welded to the main body 40 of the electrode as shown at 42. The current is provided to the electrode from an external electrical source marked generally as V, with the ram and electrode being maintained negative and the crucible being maintained positive. A drive mechanism 44 is provided externally of the furnace and is adapted to move the electrode vertically within the housing. Drive mechanisms are well known in the art and function to raise and lower the electrode to maintain the proper preselected arc length, the result of which is a general lowering of the electrode as the melting progresses.

The signalling device of this invention includes a sealed reel housing 50 which is secured in sealed, communicating relation to the upper furnace shell 14. The reel housing 50 has disposed therein a rotatable, spring biased reel 52, electrically insulated from the housing and furnace by insulator 53, on which a length of insulated wire 54 is spooled. Woven asbestos or glass fibre makes a suitable insulation against both electricity and heat. The wire 54 extends from the reel 52 through an aperture 56 in the housing 50, and has one end thereof secured, preferably by welding adjacent the upper end of the main body 40 of the electrode in the vicinity of the weld 42. As will be understood, the lower end of the wire 54 may also be secured at any convenient point along the stub 38. The other end of the wire is connected to a terminal 58 on the reel 52. The terminal 58 is connected by a wire extending through a sealed and insulated aperture in the housing 50 to one side of a lamp 60, the other side of which is grounded.

A portion of the current from power source V flows through the ram 34, clamp 36 and the electrode, and thence through the wire 54 and through lamp 60 as long as the connection of the wire 54 to the electrode remains unbroken. This will cause the lamp 60 to glow, giving an indication that the wire is properly connected. As the melting of the electrode progresses with the ram advancing the electrode downwardly, the wire 54 is unwound from the spring biased reel 52; when the melting reaches the region where the end of the wire is joined to the electrode, the connection of the wire to the electrode will be broken and the spring biased reel 52 retracts the wire onto the reel. This will break the circuit and interrupt the current flowing through the wire 54, thus de-energizing the lamp 60, causing it to go out. This will indicate to the operator that the melting has progressed to the point of attachment of the lower end of wire 54, and he can take suitable precautions to prevent damage to the clamp and/or ram which might occur because of continued uncontrolled melting.

While one embodiment of this invention has been shown and described, it will be understood that various adaptations and modifications may be made without departing from the scope and appended claims.

I claim:
1. In a consumable electrode furnace having an enclosed melting chamber, an elongated electrode secured within said chamber by a clamp device to a movable ram which extends outwardly of said chamber, said electrode being disposed to be consumed toward said clamp and moved downwardly by said ram as said electrode is consumed, the combination of, a signalling device disposed external of said furnace, a wire means having one end thereof electrically connected at a predetermined position along said electrode relative to said clamp and the other end carried by said furnace, said wire means having a supply length thereof disposed to be extended as the electrode moves downwardly in said furnace to prevent breakage of said wire means by downward movement of said ram and electrode, means for electrically connecting said ram and said wire means to an external source of electrical supply to provide for the flow of a signal current through said wire means, electrode, clamp and ram, said signalling device being connected in circuit relation with said wire means, said one end connection of said wire means to said electrode and said flow of signal current being interrupted when said electrode is consumed to said predetermined position, said signalling device being responsive to said interruption of said one end connection of said wire means and the flow of signal current therethrough to produce a signal indicative of the consumption of said electrode to said predetermined position.

2. In a consumable electrode furnace having an enclosed melting chamber, an elongated electrode secured within said chamber by a clamp device to a movable ram which extends outwardly of said chamber, said electrode being disposed to be consumed towards said clamp and moved downwardly by said ram as said electrode is consumed, the combination of, a signalling device disposed external of said furnace, an insulated wire means having one end thereof electrically connected at a predetermined position along said electrode relative to said clamp and the other end mounted on said furnace, a reel mounted on said furnace, said wire means having a supply length thereof carried in wound relation on said reel and being disposed to be unwound therefrom as the electrode moves downwardly in said furnace to prevent breakage of the wire means, means for electrically connecting said ram and said wound supply length of wire to an external source of electrical supply to provide for the flow of a signal current through said wire means, electrode, clamp and ram, said signalling device being connected in circuit relation with said wire means, said end connection of said wire means to said electrode and said flow of signal current being interrupted when said electrode is consumed to said predetermined position, said signalling device being responsive to said interruption of said end connection of said wire means and the flow of signal current therethrough to produce a signal indicative of the consumption of said electrode to said predetermined position.

3. The combination of claim 2 wherein said signalling device is a lamp.

References Cited by the Examiner
UNITED STATES PATENTS

| | | | |
|---|---|---|---|
| 218,375 | 8/79 | Fuller | 314—10 |
| 501,081 | 7/93 | Kirkegaard | 314—10 X |
| 2,762,856 | 9/56 | Newcomb et al. | 13—9 X |

RICHARD M. WOOD, *Primary Examiner.*
JOSEPH V. TRUHE, *Examiner.*